United States Patent [19]
Lin et al.

[11] Patent Number: 5,689,911
[45] Date of Patent: Nov. 25, 1997

[54] EASY TIE FISH HOOK

[76] Inventors: Chun Shiong Lin; Jefferson Lin; Philip Lin; Thomas Lin; Ziu Eng Xu, all of 7809 Carter Dr. #7, Overland Park, Kans. 66204

[21] Appl. No.: 601,351

[22] Filed: Feb. 16, 1996

[51] Int. Cl.⁶ .......................... A01K 91/04; A01K 83/00
[52] U.S. Cl. .......................... 43/43.16; 43/44.83
[58] Field of Search .............. 43/43.16, 44.83, 43/44.82

[56] References Cited

U.S. PATENT DOCUMENTS

| | | | |
|---|---|---|---|
| D. 33,775 | 12/1900 | Bower | 43/44.83 |
| 77,365 | 4/1868 | Fish | 43/43.16 |
| 86,154 | 1/1869 | Hiltz | 43/44.83 |
| 196,648 | 10/1877 | Edgar | 43/43.16 |
| 310,118 | 12/1884 | Bower | 43/43.16 |
| 895,493 | 8/1908 | O'Brien | 43/44.83 |
| 1,333,101 | 3/1920 | Cooper | 43/44.83 |
| 1,471,959 | 10/1923 | Halferty | 43/44.83 |
| 2,138,702 | 11/1938 | Litsey | 43/44.83 |
| 3,878,637 | 4/1975 | Flower | 43/44.83 |
| 4,092,796 | 6/1978 | Adams | 43/44.83 |
| 4,535,562 | 8/1985 | Fry | 43/43.16 |
| 5,279,067 | 1/1994 | Tollison | 43/44.83 |

FOREIGN PATENT DOCUMENTS

| | | | |
|---|---|---|---|
| 72467 | 8/1947 | Norway | 43/44.82 |
| 2030032 | 4/1980 | United Kingdom | 43/44.83 |

*Primary Examiner*—Kurt Rowan
*Attorney, Agent, or Firm*—Harrison & Egbert

[57] ABSTRACT

A fishing hook including a shank portion having a hook at one end and a slotted portion formed at an end of the shank portion opposite the hook. The slotted portion has an area in surface-to-surface contact with a surface of the shank portion. The area in surface-to-surface contact with the surface of the shank portion is distal the end which is joined with the shank portion. The slotted portion includes a first end contiguously joined to the shank portion, a central portion extending from the first end and tapering inwardly toward the shank portion, and a second end extending outwardly from the shank portion at the area in surface-to-surface contact with the shank portion. The first end, the central portion, and the second end are contiguous. The first end, the central portion, and the second end are in planar relationship with the shank portion.

19 Claims, 1 Drawing Sheet

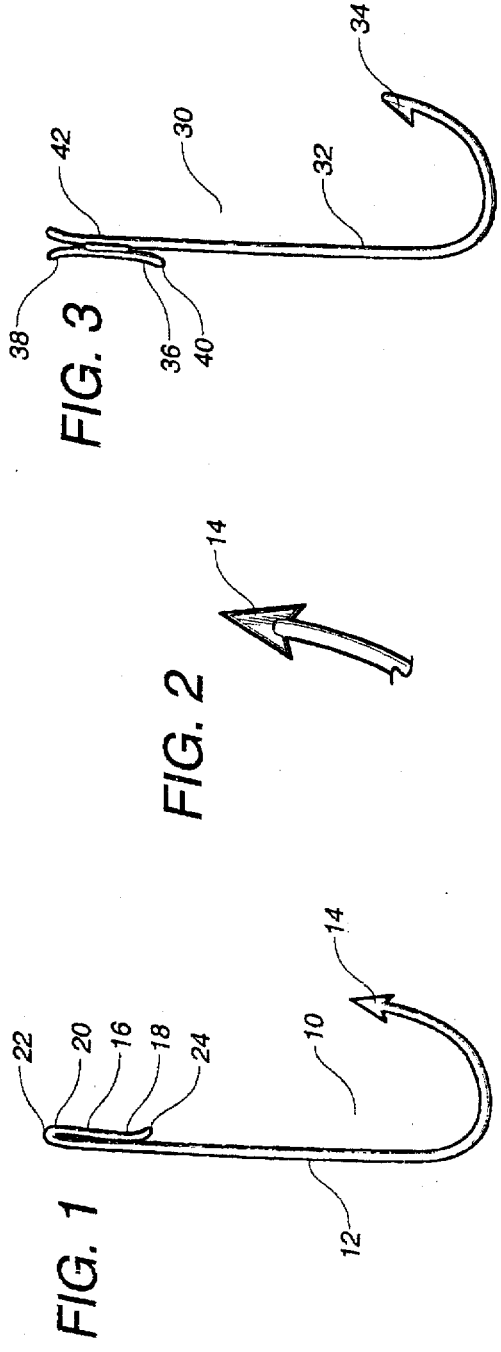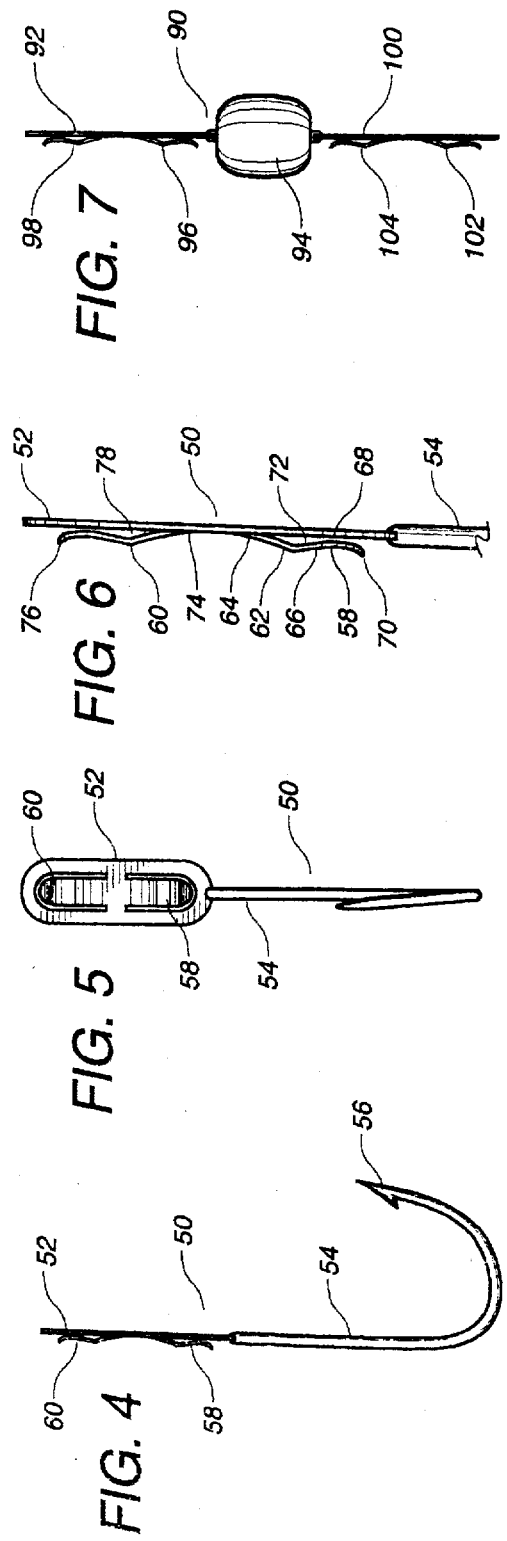

EASY TIE FISH HOOK

TECHNICAL FIELD

The present invention relates generally to fishing hooks. More particularly, the present invention relates to fishing hooks in which the fishing line can be easily attached to the fishing hook.

BACKGROUND ART

The tying of fishing lines to fish hooks presents many problems. The use of such lines makes knot tying difficult even under good conditions. With wet and/or cold hands, this problem is greatly magnified. Because of the popularity of fishing, much interest has been directed toward finding ways of simplifying the attachment of fishing lines to fishing hooks.

One development in the field of attaching fishing lines to fishing hooks is found in U.S. Pat. No. 5,279,067, issued on Jan. 18, 1994, to Bruce O. Tollison. This patent describes a method of attaching a line to a hook item such as a fishing hook, a plug, a gig, a lure or a spoon. Each hook item includes an elongated shank and an open-ended slot disposed contiguous with one end of the shank. The slot is formed from the material from which the shank is fabricated. The slot is formed by the bending back of the shank upon itself such that the slot is tapered, having a slight divergence toward the open end of the slot. A line having a transverse cross-section with a radius approximately equal to the radius of curvature of the closed end of the slot is employed. In order to attach the line to the hooked item, one must place an end of the line through the slot, run a portion of the line past the slot along the shank, wrap the line extending beyond this portion around it and the shank, and finally pulling the free end of the line into the slot and toward the closed end thereof of the slot. When the line is so pulled, it entwines upon itself, bunches and wedges into the slot. The resultant tie becomes stronger as load is applied to the line.

Unfortunately, experiments with this technique have uncovered several problems. Most importantly, it has been found that, because of the configuration of the slotted area, the line can become easily untied under various circumstances. Additionally, the technique for attaching the line within this slot is a very cumbersome technique. Since the slotted area contiguously diverges and is not closed, it is fairly easy for the fishing line to become untied. As a result, the device, although having a desirable intended purpose, has not functioned effectively in actual use. As a result, the present invention was developed so as to improve upon the technique taught by this prior art patent.

It is an object of the present invention to provide an easy tie fish hook which makes attachment of a fishing line to the fishing hook extremely easy.

It is another object of the present invention to provide an easy tie fish hook which resists inadvertent release of the fishing line from the hook.

It is a further object of the present invention to provide an easy tie fish hook that is adaptable for a wide variety of situations encountered in the fishing environment.

It is another object of the present invention to provide an easy tie fish hook which is easy to manufacture, relatively inexpensive, and easy to use.

These and other objects and advantages of the present invention will become apparent from a reading of the attached specification and appended claims.

SUMMARY OF THE INVENTION

The present invention is a fishing hook that comprises a shank portion having a hook at one end, and a slotted portion formed at an end of the shank portion opposite the hook. The slotted portion has an area in surface-to-surface contact with a surface of the shank portion so as to define a line-receiving opening between the area in surface-to-surface contact and the end of the slotted portion which is joined to the shank portion.

In particular, the slotted portion includes a first end contiguously joined to the shank portion, a central portion extending from the first end and tapering inwardly toward the shank portion, and a second end extending outwardly from the shank portion at an end of the central portion opposite the first end. The central portion has an area opposite the first end in surface-to-surface contact with the shank portion. The first end, the central portion and the second end are contiguous. Additionally, the first end, the central portion and the second end are in planar relationship. The line-receiving opening has a radius generally matching the radius of a fishing line received therein.

In an alternative embodiment of the present invention, the slotted portion includes a first slotted portion opening toward a top end of the shank portion and a second slotted portion opening in a direction opposite to that of the first slotted portion. Each of the first and second slotted portions serves to receive a fishing line therein. In one embodiment of the present invention, these first and second slotted portions are affixed to a surface of the shank portion. In an alternative embodiment of the present invention, these first and second slotted portions are formed in a flattened surface of the shank portion by stamping.

BRIEF DESCRIPTION OF THE DRAWINGS

FIG. 1 is a side elevational view of the easy tie fishing hook in accordance with the preferred embodiment of the present invention.

FIG. 2 is a closeup view of the spear-like double prong fishing hook as used in the present invention.

FIG. 3 is a side elevational view of a first alternative embodiment of the easy tie fishing hook of the present invention.

FIG. 4 is a side elevational view of a second alternative embodiment of the easy tie fishing hook of the present invention.

FIG. 5 is a frontal view of the alternative embodiment of FIG. 4.

FIG. 6 is a detailed view of the flattened surface and slotted portions of the alternative embodiment of FIG. 4.

FIG. 7 illustrates a third alternative embodiment of the present invention in which the slotted portions and shank portions are joined to a swivel hook.

DETAILED DESCRIPTION OF THE INVENTION

Referring to FIG. 1, there is shown at 10 the easy tie fishing hook in accordance with the preferred embodiment of the present invention. The easy tie fishing hook 10 includes a shank portion 12 having a hook 14 at one end and a slotted portion 16 formed at an end of the shank portion 12 opposite the hook 14. The slotted portion 16 has an area 18 in surface-to-surface contact with a surface of the shank portion 12. A line-receiving opening 20 is formed in the area between the slotted portion 16 and the surface of the shank portion 12.

It can be seen in FIG. 1 that the slotted portion 16 includes a first end 22 which is contiguously joined to an upper end of the shank portion 12. A central portion extends from the first end 22 and tapers inwardly toward the shank portion 12. The area 18 in surface-to-surface contact with the surface of the shank portion 12 is opposite the first end. The line-receiving opening 20 is defined by the area between the shank portion 12, the first end 22, and the central portion 16. A second end 24 extends outwardly from the shank portion 12 from the end of the central portion 16 that is in surface-to-surface contact with the shank portion 12. The second end 24 serves as a guide for allowing a fishing line to enter through the area 18 and into the line-receiving opening 20. The area between the first end 22 and the second end 24 needs to be flattened in order to increase its elasticity. If this area were not flattened, then there is not enough elasticity with which to effectively insert the fishing line.

In normal use, the fishing line can be secured within the line-receiving opening 20 by extending a portion of the line along a surface of the shank portion 12, wrapping the line around the shank portion 12 and pulling the wrapped-around line upwardly into the line-receiving opening 20 through the area 18 in surface-to-surface contact. Since the area 18 is in surface-to-surface contact with the surface of the shank portion 12, it is difficult, if not impossible, for the fishing line (secured in the fishing line receiving opening 20) to slide downwardly and outwardly therethrough. The second end 18 serves as a guide so as to facilitate the insertion of the wrapped-around fishing line into the line-receiving opening 20.

As can be seen in FIG. 1, all of the portions of the fishing hook 10 are contiguous. In other words, the hook 14, the shank portion 12, and the slotted portion 16 are formed of a single piece of steel or wire. The fishing hook 10 should have sufficient strength so as to capture a desired fish. The slotted portion 16 can be formed by conventional fishing hook forming processes. The shank portion 12 and the slotted portion 16 are formed in planar relationship. As described herein, the line-receiving opening 20 will have a radius that generally matches the radius of a fishing line received therein. However, this is not a fixed requirement of the present invention. It is possible for the line-receiving opening to have a greater diameter than that of the diameter of the fishing line received therein so long as the area 18 in surface-to-surface contact with the shank portion 12 is sufficiently secure so as to prevent the fishing line from passing therethrough.

FIG. 2 is a detailed illustration of the hook 14 as used on the preferred embodiment 10 of the fishing hook of the present invention. In particular, the hook 14 is a spear-like double prong hook. Such a hook can more securely capture any fish. This spear-like double prong can be oriented to any desired angle.

FIG. 3 is an alternative embodiment 30 of the fishing hook of the present invention. The fishing hook 30 includes a shank portion 32 with a hook 34 at one end. A slotted portion 36 is affixed to the shank portion 32 at an end of the shank portion 32 opposite the hook 34. The slotted portion 36 includes a first slotted portion 38 opening toward the end of the shank portion 32 opposite the hook 34 and a second slotted portion 40 opening in a direction opposite to the first slotted portion 38. Each of the slotted portions 38 and 40 serves to receive a fishing line therein. The first slotted portion 38 and the second slotted portion 40 are joined to the shank portion 32 at an area 42 between the first slotted portion 38 and the second slotted portion 40. In particular, the slotted portions 38 and 40 can be secured to the shank portion 32 by conventional forming processes, such as welding, tacking, or stamping.

Each of the first slotted portion 38 and the second slotted portion 40 has a line-receiving opening adjacent to the area 42 joined to the shank portion 32. This line-receiving opening will have a radius approximately equal to the radius of a fishing line received therein.

In the embodiment of FIG. 3, the fishing line can be secured to the fishing hook 30 in the manner described in conjunction with FIG. 1. Typically, the fishing line will extend along for a length of the shank 32. The fisherman will then loop the fishing line around the shank portion 32 and into and around the line-receiving openings formed by the slotted portions 38 and 40.

FIG. 4 is a second alternative embodiment 50 of the fishing hook of the present invention. In the fishing hook 50, a flattened surface 52 is formed at an upper end of the shank portion 54 opposite the hook 56. The flattened surface 52 can be formed by a conventional stamping operation. A first slotted portion 58 and a second slotted portion 60 are formed on the flattened surface 52 by the stamping process. The first slotted portion 58 and the second slotted portion 60 are configured so as to secure a fishing line therein.

FIG. 5 shows a frontal view of the alternative embodiment 50 of the fishing hook of the present invention. It can be seen that the flattened surface 52 is formed at the upper end of the shank portion 54. The first slotted portion 58 and the second slotted portion 60 are formed in the flattened surface 52 by a conventional stamping process. The use of this conventional stamping process will assure that the fishing hook 50 is formed in an inexpensive and easy-to-use manner.

Referring to FIG. 6, there is shown a detailed view of the flattened surface 52, along with the first slotted portion 58 and the second slotted portion 60. It can be seen that the first slotted portion 58 has an identical configuration to that of the second slotted portion 60. The only difference is that the first slotted portion 58 will open in a different direction than the second slotted portion 60.

With reference to the first slotted portion 58, it can be seen that the first slotted portion 58 includes a first section 62 extending outwardly from a first end 64 away from the flattened surface 52. The first end 64 is contiguously joined to the flattened surface 52. A second section 66 extends inwardly from the end of the first section 62 opposite the first end 64. This second section 66 has the area 68 in surface-to-surface contact with the flattened surface 52 of the shank portion 54. A third section 70 extends outwardly from the area 68 of the second section 66. The first section 62, the second section 66 and the flattened surface 52 define a line-receiving opening 72 therein.

The second slotted portion 60 has a first end 74 contiguously joined to the flattened surface 52. The second slotted portion 60 has a second end 76 opening toward a top of the shank portion 54 and the flattened surface 52. The second slotted portion 60 has a configuration matching that of the first slotted portion 58.

As shown in FIGS. 4–6, the alternative embodiment 50 can be used in a manner similar to that as described in conjunction with the alternative embodiment 30. In particular, a fishing line can extend along the flattened surface 52 and the shank portion 54. The fishing line can wrap around the flattened surface 52 and the shank portion 54, along with the line extending therealong, so as to fit within the line-receiving opening 72 and the line-receiving opening 78 of the first slotted portion 58 and the second slotted portion 60, respectively. This will secure the fishing line to the fishing hook 50 so that it is virtually impossible for the fishing line to disengage from the fishing hook 50.

FIG. 7 shows a third alternative embodiment 90 of the present invention. In the alternative embodiment 90, a first shank portion 92 is joined to a swivel 94. The first slotted portion 96 and the second slotted portion 98 are joined to the shank portion 92 in the manner described in conjunction with FIGS. 4–6. Additionally, a second shank portion 100 is also connected to the swivel 94 and extends outwardly of the swivel 94 on an end of the swivel 94 opposite to the first shank portion 92. The second shank portion 100 also includes slotted portions 102 and 104. Slotted portions 102 and 104 are formed in the manner described in conjunction with FIGS. 4–6. As such, it can be seen that the alternative embodiment 90 can be used as part of a swivel hook. It is also important to note that the embodiment 90 of FIG. 7 can also have the slotted portions 96, 98, 102 and 104 in the form of the line-receiving areas shown in the embodiments of FIG. 1 or FIG. 3.

The foregoing disclosure and description of the invention is illustrative and explanatory thereof. Various changes in the details of the illustrated configuration can be made within the scope of the appended claims without departing from the true spirit of the invention. The present invention should only be limited by the following claims and their legal equivalents.

I claim:

1. A fishing hook comprising:
   a shank portion having a hook at one end; and
   a slotted portion formed at an end of said shank portion opposite said hook, said slotted portion having an area distal said end in surface-to-surface contact with a surface of said shank portion, said slotted portion comprising:
      a first slotted portion opening toward said end of said shank portion opposite said hook; and
      a second slotted portion opening in a direction opposite said first slotted portion, each of said first and second slotted portions for receiving a fishing line therein.

2. The fishing hook of claim 1, said slotted portion comprising:
   a first end contiguously joined to said shank portion;
   a central portion extending from said first end and tapering inwardly toward said shank portion, said central portion having said area opposite said first end, said central portion defining a line-receiving opening adjacent said first end; and
   a second end extending outwardly from said shank portion at said area in surface-to-surface contact with said shank portion.

3. The fishing hook of claim 2, said first end, said central portion and said second end being contiguous.

4. The fishing hook of claim 3, said first end, said central portion and said second end being in planar relationship with said shank portion.

5. The fishing hook of claim 2, said line-receiving opening having a radius generally matching a radius of a fishing line received therein.

6. The fishing hook of claim 1, said hook being a spear-like double prong hook.

7. The fishing hook of claim 1, said first slotted portion and said second slotted portion joined to said shank portion at an area between said first and second slotted portions.

8. The fishing hook of claim 7, each of said first and second slotted portions tapering outwardly from said area joined to said shank portion.

9. The fishing hook of claim 8, each of said first and second slotted portions having a line-receiving opening adjacent said area joined to said shank portion, said line-receiving opening having a radius approximately equal to a radius of a fishing line received therein.

10. The fishing hook of claim 1, said shank portion having a flattened surface formed thereon, said slotted portion being stamped into said flattened surface.

11. The fishing hook of claim 10, said slotted portion comprising:
    a first slotted portion having a first end contiguously joined to said flattened surface, said first slotted portion having a second end opening toward a bottom of said shank portion.

12. The fishing hook of claim 11, said first slotted portion comprising:
    a first section extending outwardly from said flattened surface;
    a second section extending inwardly from an end of said first section opposite said first end, said second section having said area in surface-to-surface contact with said flattened surface of said shank portion; and
    a third section extending outwardly from said second section at said area in surface-to-surface contact.

13. The fishing hook of claim 12, said first and second sections and said flattened surface of said shank portion defining a line-receiving opening.

14. A fishing hook comprising:
    a shank portion having a hook at one end, said shank portion having a flattened surface formed thereon, said slotted portion being stamped into said flattened surface; and
    a slotted portion formed at an end of said shank portion opposite said hook, said slotted portion having an area distal said end in surface-to-surface contact with a surface of said shank portion, said slotted portion comprising;
       a first slotted portion having a first end contiguously joined to said flattened surface, said first slotted portion having a second end opening toward a bottom of said shank portion; and
       a second slotted portion having a first end contiguously joined to said flattened surface, said second slotted portion having a second end opening toward a top of said shank portion.

15. The fishing hook of claim 14, said second slotted portion having a configuration matching said first slotted portion.

16. The fishing hook of claim 14, said second slotted portion comprising:
    a first section extending outwardly from said first end away from said flattened surface;
    a second section extending inwardly from an end of said first section opposite said first end, said second section having an area in surface-to-surface contact with said flattened surface of said shank portion; and
    a third section extending outwardly from said second section at said area in surface-to-surface contact.

17. The fishing hook of claim 16, said first and second sections of said second slotted portion and said flattened surface of said shank portion defining a line-receiving opening therein.

18. The fishing hook of claim 14, said shank portion being joined to a swivel.

19. The fishing hook of claim 18, said swivel having a second shank portion connected thereto, said second shank portion having another first and second slotted portions formed thereon of similar configuration as said first and second slotted portions of said first shank portion.

* * * * *